United States Patent [19]
Garnett et al.

[11] Patent Number: 5,970,599
[45] Date of Patent: Oct. 26, 1999

[54] MILLING MACHINE

[75] Inventors: Donald W. Garnett, Grand Ledge; John A. Watson, East Lansing, both of Mich.

[73] Assignee: The Olofsson Corporation, Lansing, Mich.

[21] Appl. No.: 08/891,964

[22] Filed: Jul. 14, 1997

[51] Int. Cl.[6] .................................................. B23Q 7/00
[52] U.S. Cl. ............................ 29/563; 29/33 P; 29/564; 409/164
[58] Field of Search .................................... 29/33 P, 563, 29/564; 409/163, 164, 165, 202, 212, 137; 483/14

[56] References Cited

U.S. PATENT DOCUMENTS

| | | | |
|---|---|---|---|
| 4,494,298 | 1/1985 | Matsura et al. | 29/563 |
| 4,706,371 | 11/1987 | McMurtry | 483/14 |
| 5,321,874 | 6/1994 | Mills et al. | 409/164 |
| 5,347,704 | 9/1994 | Everlove et al. | 29/563 |
| 5,781,983 | 7/1998 | Grüner | 29/563 |

*Primary Examiner*—William Briggs
*Attorney, Agent, or Firm*—Reising, Ethington, Barnes, Kisselle, Learman & McCulloch, PC

[57] ABSTRACT

A milling machine having a horizontal slide and a vertical slide. The horizontal slide is mounted for movement between a loading station and a milling area. The vertical slide is mounted on the horizontal slide for vertical movement. A chuck is mounted on the vertical slide and has jaws for gripping a workpiece at the loading station. Milling tools in the milling area mill a workpiece held by the chuck when the horizontal slide is moved to the milling area. The milling tools include a face mill, a semi-finish end mill and a finish end mill which are arranged in a straight line along the path of movement of the chuck when the horizontal slide is moved from the loading station to the milling area. All of the milling tools are mounted in a receptacle which is capable of positioning the milling tools offset from the center line of the workpiece.

13 Claims, 10 Drawing Sheets

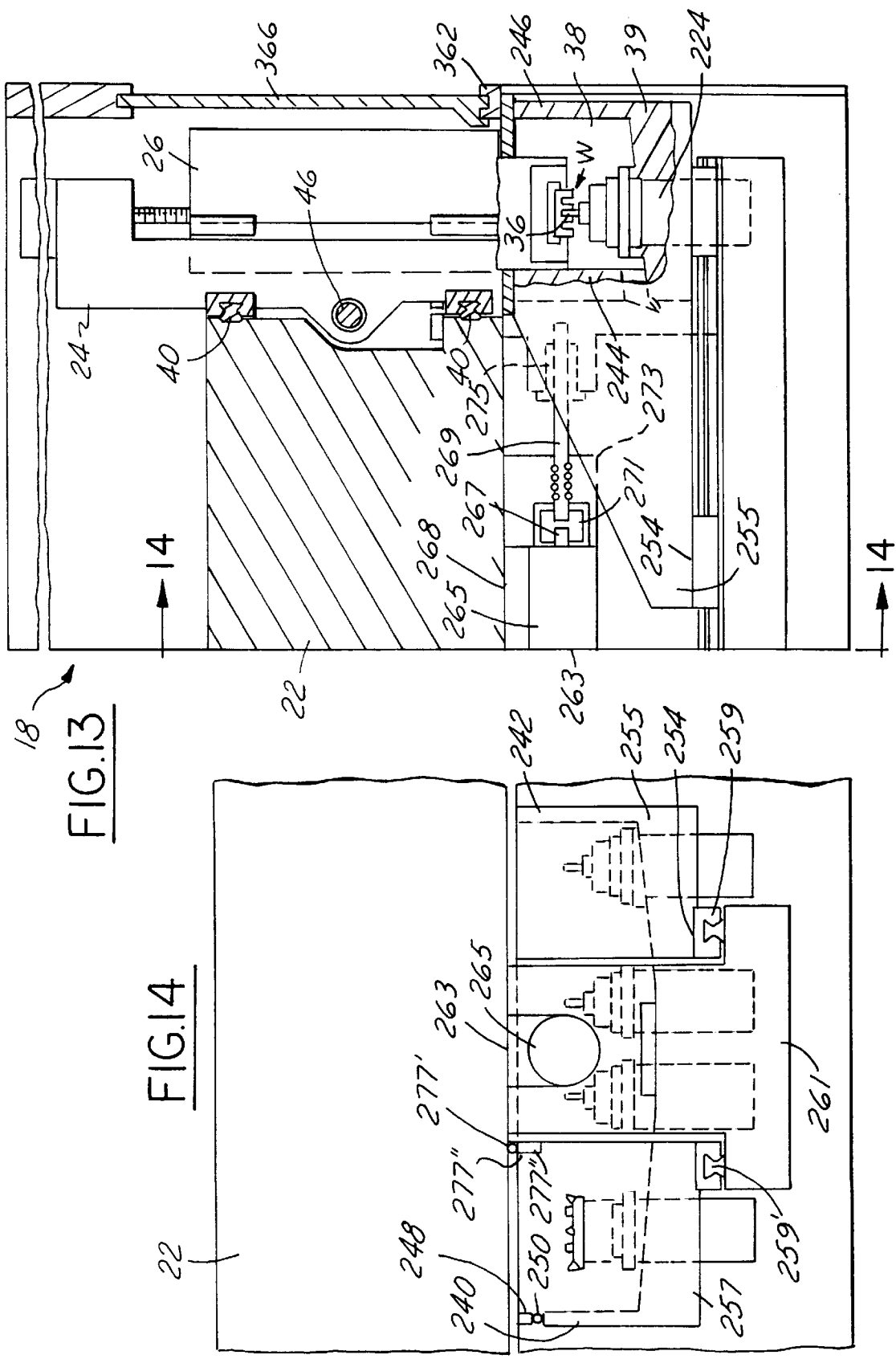

MILLING MACHINE

FIELD OF INVENTION

This invention relates generally to milling machines to mill workpieces, gage the finished parts, and automatically make corrections for the machining of subsequent parts. The invention relates more particularly to a milling machine having end mills to mill the scroll contour features of essential parts of a scroll compressor.

BACKGROUND AND SUMMARY OF THE INVENTION

End milling machines for certain parts that must be precisely oriented and located in relation to pre-existing features on the workpiece, have previously required hand loading to reliably position the workpiece in a holding chuck. This is especially true of scroll parts. As a result, total production time is slowed and inconsistent due to the hand loading operation.

This invention provides the necessary scroll part positioning combined with self-loading and unloading of the workpiece, utilizing the same horizontal and vertical machine slides that are used for machining moves.

The facilities for the load-unload operation include:

(A) conveyor for conveying multiple pallets carrying oriented workpieces;

(B) A pallet escapement mechanism to pre-position a pallet in the loading station;

(C) Precise positioning of the pallet in the loading station by downward engagement of two chisel pointed splines into two receiving grooves in the pallet;

(D) Firmly seating the workpiece against rest buttons in the part chuck by continuing downward movement against a compliant conveyor bed after the initial rest button contact;

(E) Part jaw clamping of the workpiece with detection of loading errors or improperly machined workpieces;

(F) Further detection of improper projection of the clamped part, by passage of the workpiece across an interference sensing wall, to sense possible workpiece misposition and inhibit further machine motion; and (G) Finish machined workpieces are returned to their original pallet by the machine slides. The following pallet is then indexed ahead and the next machine cycle begins.

Previously, the scroll workpieces have been chucked in the horizontal attitude, even though they are conveyed to the machine in the vertical attitude. This required a separate loading motion to rotate the workpiece 90° for loading. This invention chucks and mills the scroll workpiece in the same attitude in which it is conveyed.

To precisely mill workpiece size requires an accurate pre-semi-finish operation to remove rough stock and present workpieces (with a uniform amount of stock for removal) to a subsequent finish mill operation. Previously, semi-finish operations were performed in different machines and in different chucks than those for the finish mill operation. Lack of repeatability of position in the first and second chucking causes variation in the stock that must be removed in the finish mill operation. Also, when workpieces are semi-finished in multiple semi-finish machines, a variation in the semi-finish dimensions results between machines. In addition, within just a single semi-finish machine, there are still dimensioned trend changes due to various factors such as tool wear, tool exchange, thermal growth, etc. If these workpieces do not follow in sequence to the finish operation, the finish operation will see abrupt changes in the amount of finish stock to be removed, resulting in inaccuracy.

This invention semi-finish mills and finish mills the workpiece in the same chucking operation. Also workpieces are finish milled in the same sequence in which they were semi-finished. In this way, there is no loss of workpiece position due to rechucking, and the finish operation is not presented with abrupt workpiece size changes due to being processed out of sequence.

The assembly of scroll components into a scroll compressor requires precise location of the relative parts. Scroll features are machined to provide the necessary alignment. Previously, these alignment features were milled in a separate machine. Lack of repeatability of position in the first and second chucking caused machining errors and, subsequently, misalignment of the scroll components.

In accordance with the invention, the alignment features are milled in precise alignment with the scroll by completing the alignment milling without rechucking after the scroll is milled.

In milling, chips must be removed from the cutting area to prevent recutting the chips, which can cause poor finish and inaccuracy. Previously, the workpieces have been milled in the horizontal attitude with the chips tending to lay in the machining cavity of the workpiece.

This invention, with its inverted scroll attitude, provides gravity assistance in removing chips from the machining cavity.

Semi-finishing of the face of the scroll wall has previously been milled using the end of the same end mill as used for milling the sides of the walls. The long path along the scroll requires considerable cycle time and the tool wear which occurs in the long path shortens the usable life of the end mill.

The invention provides an additional machining station, equipped with a large, long-life face mill, to mill the full face of the scroll in one quick short pass and remove wear effect from the semi-finish end mill.

Milling operations generate a heavy coolant mist. Previously, the opening of loading doors has allowed some of this coolant mist to escape and become a hazard to both the operator's health and the machine mechanism.

This invention provides a virtually closed machining area, thus preventing escape of the coolant mist.

In milling of the walls of a scroll workpiece, the side pressure on the end mill causes the end mill to deflect in a cantilever manner resulting in taper of the milled scroll walls. This invention incorporates the invention of copending application of Garnett and Watson (owned by a common assignee), Ser. No. 08/443,011, filed May 17, 1995, to correct wall taper due to end mill side deflection, and the disclosure of which is incorporated herein by reference.

Previously, dimensioned accuracy of the milled workpiece had to be determined in a separate gaging machine, followed by human assessment of how much tool offsets needed to be corrected before milling subsequent parts. These offsets have had to be manually entered in the control.

A machine constructed in accordance with this invention automatically corrects for all inaccuracy, of (A) variations in wall taper, (B) wall position, and (C) variation from the theoretical involute path of the scroll. A gaging station is provided to gage an occasional workpiece and feed back corrections to the tool offset program for subsequently milled workpieces.

Passage of the scroll part over a series of multiple stations requires a long stroke and, to reduce the cycle time needed for the long stroke, a high velocity of travel is needed. To provide precision position control of the slide in critical areas wherein a ball screw is utilized, the ball screw nut must be preloaded resulting in a shortened life of the ball screw and ball nut arrangement. In the workpiece loading and face milling areas, the position control is not as critical and the preload may be reduced to extend the ball screw life. The machine of this invention incorporates variable preloading of the ball screw nut.

To assure precise depth milling of the workpiece, the machine design should direct the milling force vector as nearly as possible to the supporting ways.

The machine of this invention has the rotary axis built into the vertical slide to provide a minimum of rotary axis overhang from the supporting slides for rigid vertical positioning.

End mills used in the milling operation are a perishable item and must be frequently replaced. For convenience, the end mills should be positioned in full view of the machine operator at a convenient height and within easy reach. This invention provides upward facing mills and short reach access.

Spindles used for the milling tools in scroll machining operations are necessarily high rpm spindles and, as such, the bearings have a relatively short life. To reduce machine down time during servicing, this invention provides easy vertical removal and replacement of the spindles.

Since spindles and spindle arrangement requirements vary between scroll manufacturers, this invention provides a spindle containment tub or receptacle for all of the spindles, which can readily be exchanged with an alternate arrangement without affect on the remainder of the machine structure.

Some scroll designs include keyway slots which must be precisely positioned in relation to the scroll contour. This invention provides an additional servo controlled axis to accomplish the keyway machining of keyway slots which are offset from the centerline of the scroll part. Since the keyway is machined in the same chucking as used for the scroll machining, errors caused by rechucking are eliminated. This feature is also useful in machining some scroll features.

In operation of a machine tool, heat is introduced into the machine structure. This, along with variation in the ambient temperature of the factory, causes thermal distortion in the machines and inaccuracy in the machining. Also, forces generated by machining forces within a machine cause elastic deformation and inaccurate machining. To minimize these two effects, it is desirable to closely couple the workpiece holding chuck to the milling tool through a structural path which is as short as possible. This invention provides the desired closely coupled arrangement as compared to other arrangements in which the coupling is remote, requiring extensive auxiliary cooling of the machine structure and providing less resistance to distortion due to machining stresses.

The machine of this invention is self-contained with all facilities mounted on a single pair of skid rails for easy placement on the factory floor and therefore reduces the size of the required and expensive floor space, as compared to a machine with separate electrical control, separate spindle coolant facilities, separate hydraulic supply unit and others.

One object of this invention is to provide a milling machine having the foregoing features and capabilities.

Another object is to provide a milling machine which is rugged and durable in use and is capable of rapidly and accurately semi-finishing the work and then finishing the work to final form, all in a single machine and in a single chucking operation.

These and other objects, features and advantages of the invention will become more apparent as the following description proceeds, especially when considered with the accompanying drawings.

BRIEF DESCRIPTION OF THE DRAWINGS

FIG. 3 is a plan view in partial section taken on the line 3—3 in

FIG. 1B, with the cover over the milling tools removed for purposes of clarity.

FIG. 13 is a sectional view taken along the line 13—13 in FIG. 1A.

FIG. 14 is a partial view from the rear of the machine taken along line 14-4 in FIG. 13.

DETAILED DESCRIPTION OF THE PREFERRED EMBODIMENT

Figure 1A:
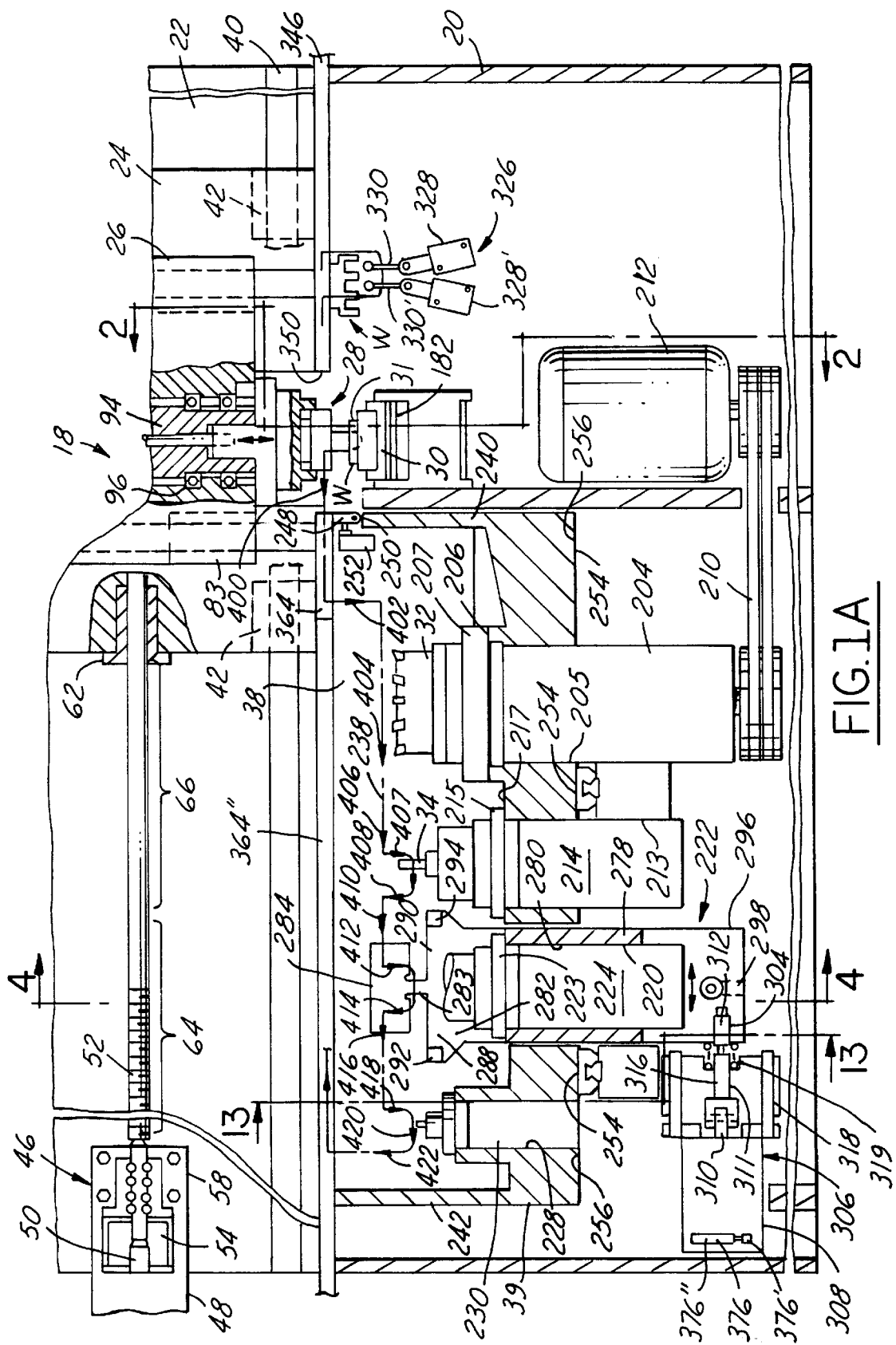
FIGS. 1A and 1B are vertical sectional views of a machine constructed in accordance with the invention, taken along the lines 1—1 in FIG. 2, FIG. 1A representing the lower portion of the machine and FIG. 1B representing the upper portion.

Referring now more particularly to the drawings, a machine 18 has a frame 20 on which a support block 22 is mounted. A horizontal slide 24 is mounted on the support block 22 for horizontal sliding movement. A vertical slide 26 is mounted on the horizontal slide 24 for vertical sliding movement. A work-holding chuck 28 carried by the vertical slide 26 is adapted to grip a workpiece W carried by a pallet 30 at a loading station 31. By a combination of horizontal and vertical movements of slides 24 and 26, a workpiece in a pallet 30 may be gripped by chuck 28 and transferred from the loading station 31 across the semi-finish face mill 32, semi-finish end mill 34 and finish end mills 36 and 37 in a milling area 38 to semi-finish mill and then finish mill the workpiece. The length of the milling area includes all of the mills 32–37. The mills 32–37 are mounted in a tub or receptacle 39. The slides then return the workpiece to the loading station for unloading.

Mounted on the front face of the support block 22 are vertically spaced horizontal guide ways 40. Roller trucks 42 carried by the horizontal slide 24 slidably engage the guide ways 40 to enable horizontal movement of the slide 24.

The support block 22 also supports a servo-drive assembly 46 for moving the horizontal slide 24. The servo-drive assembly 46 comprises a servo motor 48 and drive shaft 50 connected to a horizontal ball screw 52 by a flexible coupling 54. One end of the ball screw 52 is supported by bearing block 58 to allow rotation of the ball screw but prevent axial movement. The other end of the ball screw engages a ball nut 62. Ball nut 62 is bolted to the horizontal slide 24. Rotation of the ball screw 52 causes translation of the horizontal slide 24 along ways 40.

Positioning of the ball nut 62 and slide 24 in the bracketed finish mill area 64 (FIG. 1A) where the workpiece is milled by the finish end mills 36 and 37 is critical and requires pre-loading of the balls in the ball nut 62 against the thread of the ball screw 52. In the remainder of the ball screw length bracketed at 66, pre-loading is not critical and may be relaxed to improve the life of the ball screw. The pre-loading of the balls in the ball nut against the thread of the ball screw will be now described.

Figure 9:
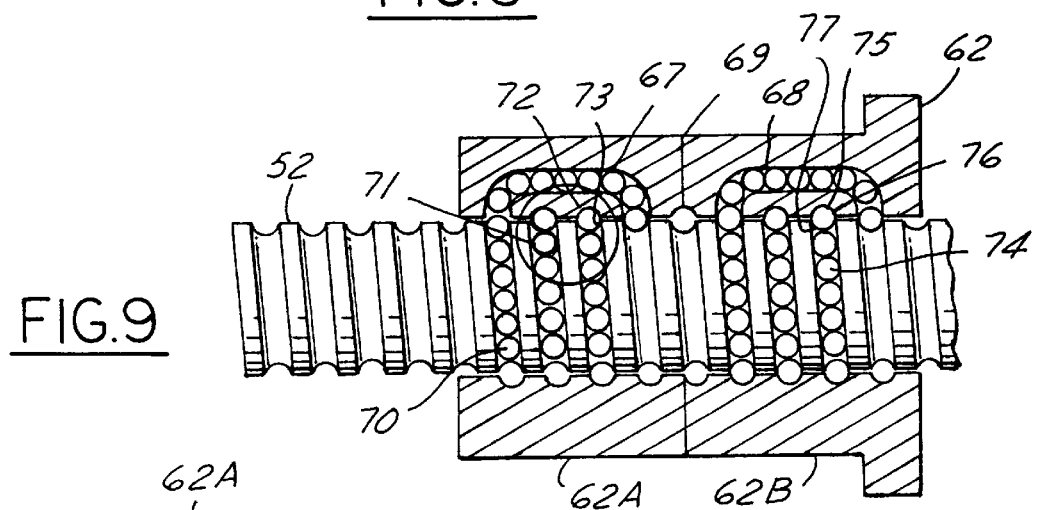
FIG. 9 is sectional view of the ball nut of the ball nut drive for the horizontal slide.
Figure 10:
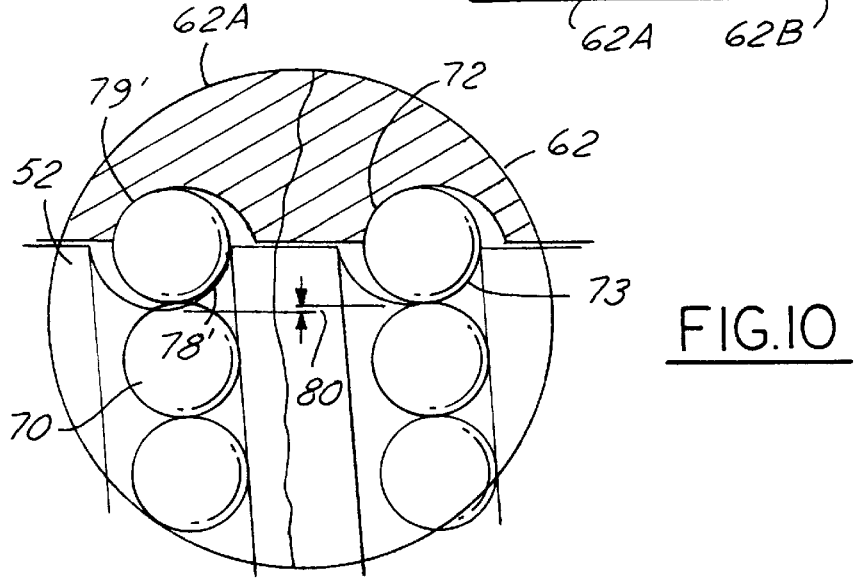
FIG. 10 is an enlarged view of a portion of the structure shown in FIG. 9 illustrating the preloading of the ball screw.

Referring to FIG. 9, the ball nut 62 is shown in section and consists of two halves. The left half 62A and right half 62B each contain a ball recirculating track with return paths 67 and 68. The pitch of the ball screw 52 and the pitch of the internal thread of the ball nut are identical. At the dividing line 69 between the two halves 62A and 62B of the ball nut, a single thread pitch distance is slightly reduced resulting in the balls 70 in the recirculating track 71 being crowded against the left wall of the thread in half-nut 62A at 72, and against the right wall of the thread in ball screw 52 at 73. Similarly, the balls 74 in the recirculating track 75 are crowded against the right wall of the thread in half-nut 62B at 76, and against the left wall of the thread in ball screw 52 at 77. This crowding or binding of the balls results in elastic deformation of the balls, ball nut thread and ball screw thread in the areas 72 and 73 (FIGS. 9 and 10). Similar deformation occurs at 76 and 77 in FIG. 9.

This dual opposed deformation axially secures the ball nut 62 on the ball screw 52, thus opposing displacement of the ball nut by external forces imposed by milling and by friction. If there is little or no deformation at these areas 72, 73, 76 and 77, location of the ball nut 62 on the ball screw 52 is not precise and disturbing forces may cause improper positioning of the workpiece relative to the finish end mills. Therefore, it is important in the finish mill area 64 (FIG. 1A) to avoid mispositioning and this is accomplished by the construction thus described.

However, in the area 66 of ball nut travel along the ball screw which is outside the finish mill area, it is less critical to rigidly hold axial position. The deformation (ball nut pre-load) can be reduced in this area, thus extending the life of the ball screw. In accordance with this construction, a reduced pre-load in the non-critical area 66 is achieved by simply grinding the ball screw 52 thread in this area 66 to a slightly smaller minor diameter, that is, a greater thread depth. Referring to FIG. 10, balls 70, ball nut 62 and ball screw 52 are shown under elastic deformation as shown at 72 and 73. By grinding the ball screw thread to a smaller minor diameter as indicated by the dimensional arrows at 80, the balls 70 are allowed to float towards the center of the ball screw and relieve the deformation at 78' and 79' as the nut passes through the non-critical travel area. The life of the ball screw is thereby extended.

Figure 3:
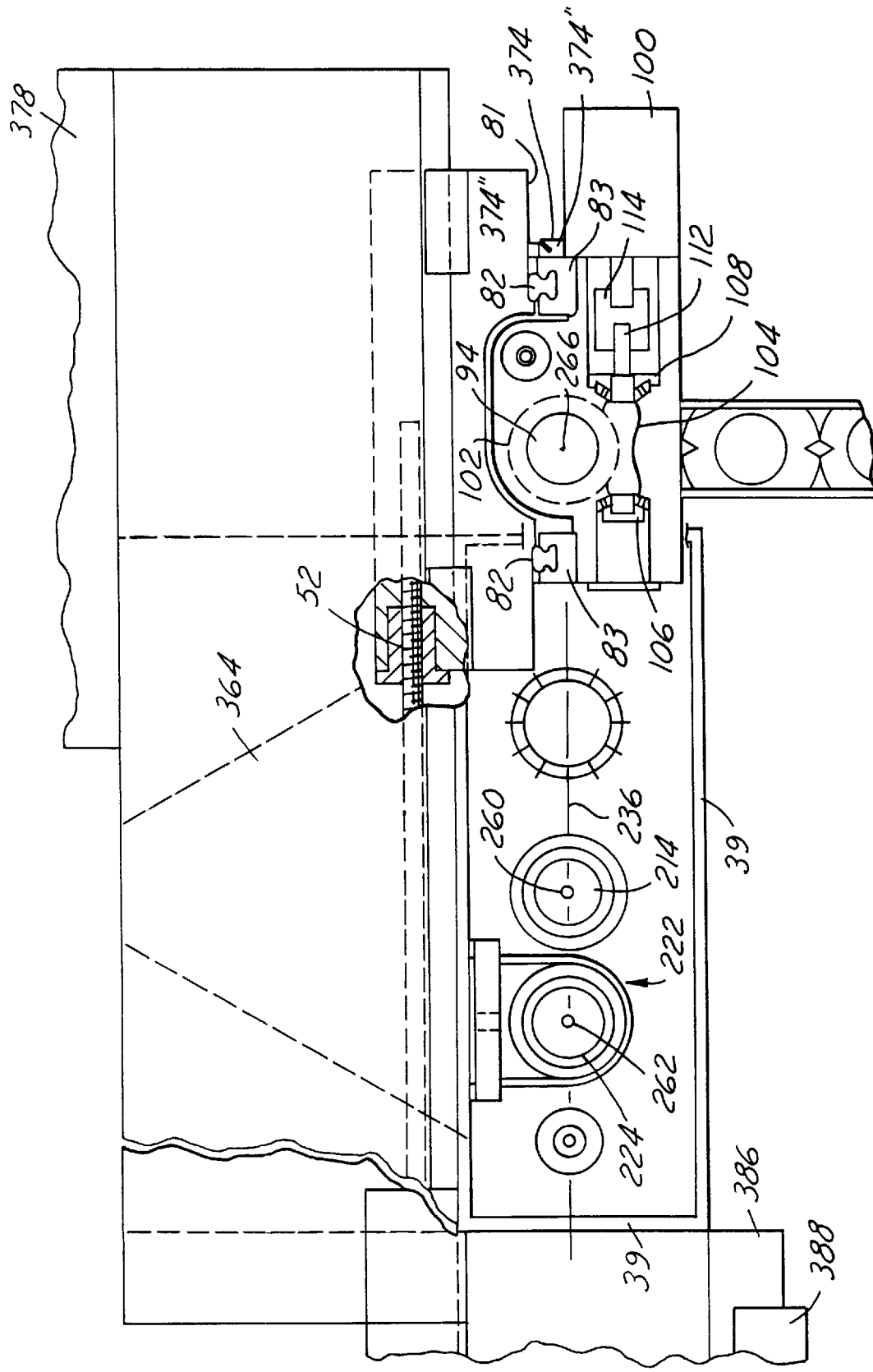

The horizontal slide 24 is fitted on its front face 81 with a pair of spaced vertical guide ways 82 (FIG. 3). The vertical slide 26 has trucks 83 (FIG. 1B) which are slidably mounted on the ways 82 to enable vertical movement of the vertical slide 26 relative to horizontal slide 24.

Figure 1B:
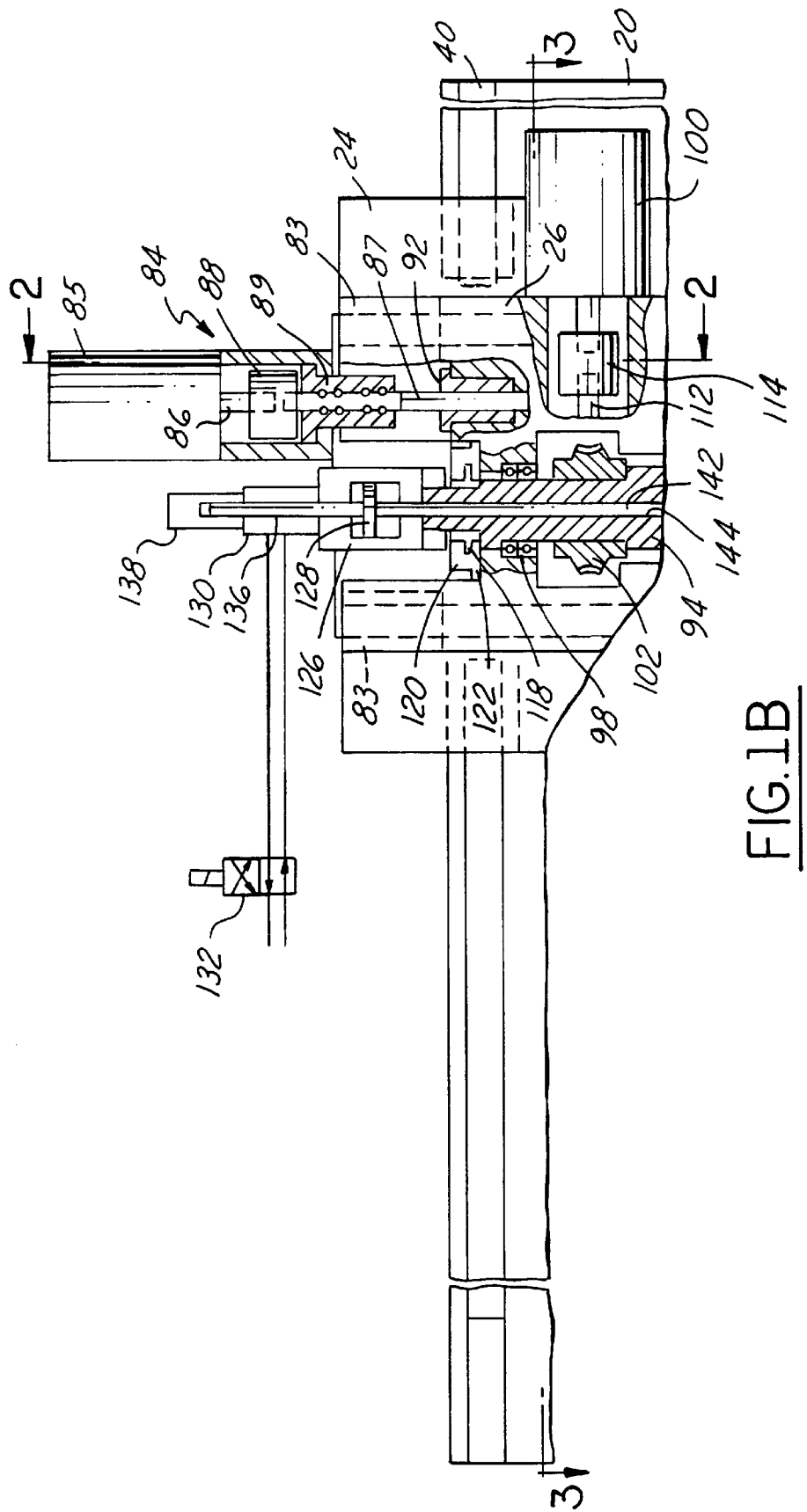
Figure 2:
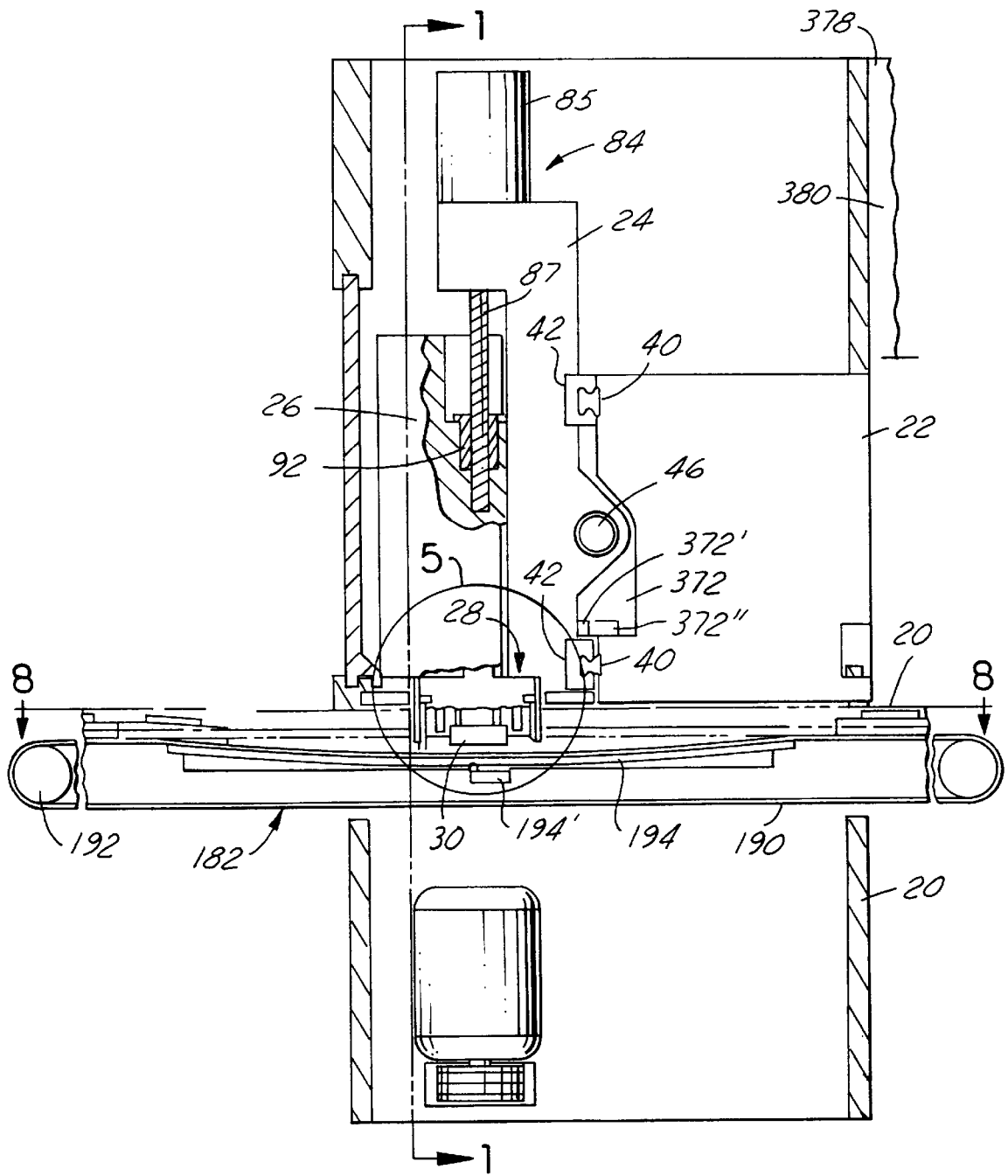
FIG. 2 is a sectional view taken along the line 2—2 in FIGS. 1A and 1B.

The horizontal slide 24 also supports a servo drive assembly generally designated 84 (FIGS. 1B and 2). The servo drive assembly 84 comprises a servo motor 85 with a drive shaft 86 connected to a vertical ball screw 87 by a flexible coupling 88. The upper end of the ball screw 87 is supported by a bearing cartridge 89 to allow rotation of the ball screw but prevent axial movement. The lower end of the ball screw 87 engages a ball nut 92 which is bolted to the vertical slide 26. Rotation of the ball screw by servo motor 85 causes vertical translation of the vertical slide 26 along the ways 82.

The vertical slide 26 has a vertical shaft 94 mounted for rotation in lower and upper bearings 96 and 98. The shaft 94 is mounted in the body of the vertical slide with virtually no overhang. The shaft 94 is rotated by a servo motor 100, a worm gear 102 and a worm 104 (FIGS. 2 and 3). The worm 104 is supported for rotation in the vertical slide 26 by bearings 106 and 108. The worm gear 102 is secured to the shaft 94 and is in driving engagement with the worm 104. A servo motor 100 is mounted on the vertical slide 26 and is connected to the shaft extension 112 of the worm by a flexible coupling 114. Rotation of the worm 104 by the servo motor 100 causes rotation of the worm gear 102 and of the shaft 94.

An upward extension of the shaft 94 mounts the rotary portion 118 of a rotary encoder 120 (FIG. 1B). The housing 122 of the encoder is mounted on the vertical slide 26 and continuously monitors the rotary position of the shaft 94.

The rotary shaft 94 has a further upward extension which mounts a rotary hydraulic cylinder 126. Within the cylinder 126 is a piston 128. Hydraulic fluid is adapted to be directed to either side of the piston through a rotary union 130. A spring offset-solenoid valve 132 provides directional control of hydraulic fluid to the top of the piston when the solenoid of the valve 132 is energized by an electrical control 134 and to the bottom of the piston when the solenoid is de-energized.

An upwardly extending rod 136 of the piston 128 passes through the rotary union 130 and enters a clamp position monitor 138. The monitor 138 monitors the position of the jaws of chuck 28 and the monitor is under the control of the electrical control 134 and may be used to advance the machine program or to signal a fault if correct clamp jaw position is not attained.

Figure 5:
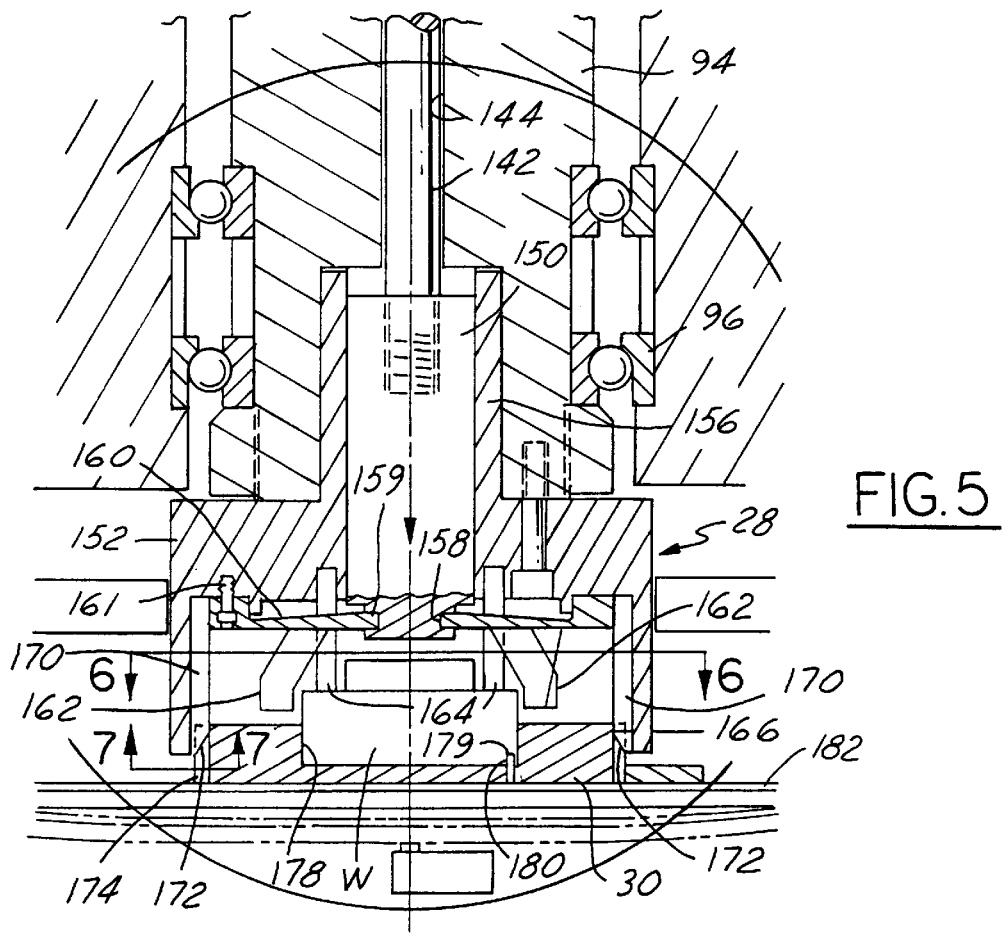
FIG. 5 is an enlarged view of a portion of FIG. 2 within the circle 5 in FIG. 2.

Piston 128 also has a downwardly extending piston rod 142 which extends through a central passage 144 in the rotary shaft 94. The lower end of the piston rod 142 is threadedly connected to a rod 150 (FIG. 5). The chuck 28 has a housing 152 rigidly secured to the lower end of the rotary shaft 94. The rod 150 is vertically slidably fitted within a tubular extension 156 of the chuck housing. The rod 150 has an annular groove 158 at the bottom end which receives the central portion 159 of an annular, flexibly resilient, diaphragm plate 160. The outer perimeter of the diaphragm plate 160 is secured to the chuck housing 152 at 161. Secured to the diaphragm plate 160 are a plurality of chuck jaws 162. When the piston 128 is actuated upwardly, the rod 142 and rod 150 also move upwardly causing the chuck jaws 162 to move inwardly to clamp a workpiece W under the influence of the diaphragm 160 in its "oil-can" movement.

A plurality of vertical pin locators 164 are mounted in the lower face of the chuck housing 152. The lower ends of the pin locators engage and locate a workpiece during a part loading operation.

Figure 7:
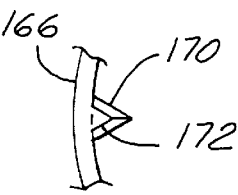
FIG. 7 is a fragmentary detail along the line 7—7 in FIG. 5.
Figure 6:
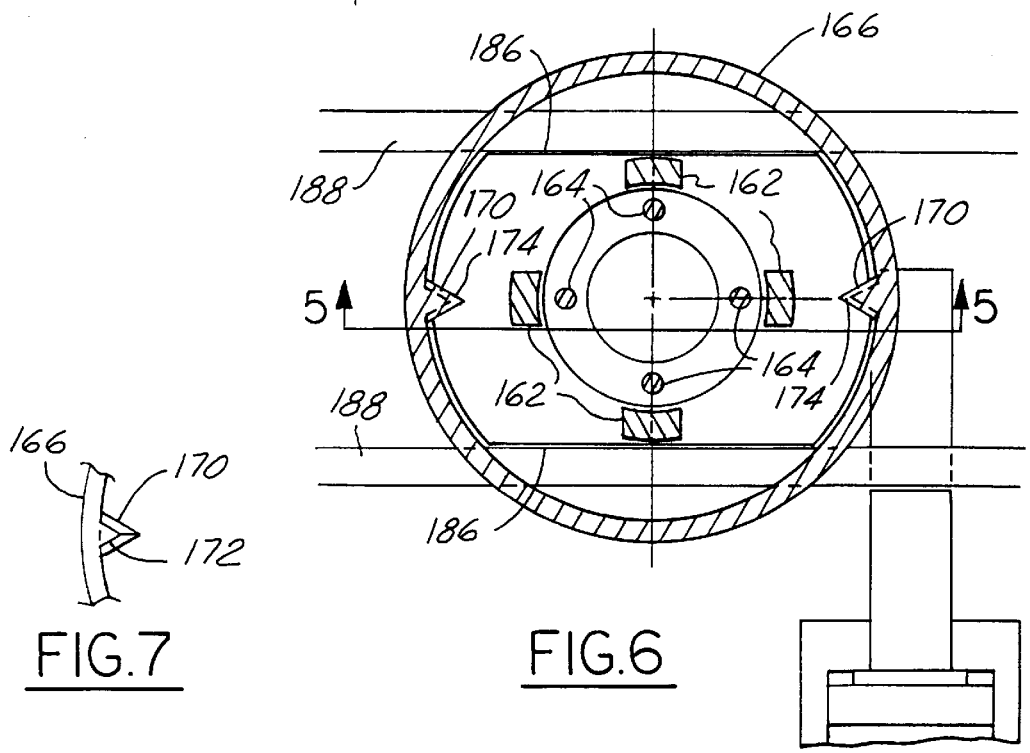
FIG. 6 is a sectional view taken along the line 6—6 in FIG. 5.

The chuck 28 has a downwardly extending cylindrical tubular skirt or enclosure 166, the internal diameter of which is large enough to surround a workpiece-carrying pallet 30 when the pallet is at the loading station. Along the internal diameter of the tubular enclosure 166 are two internal splines 170, preferably spaced 180° apart. The splines are chisel-shaped at their lower extremities 172 (FIG. 7) to enable the splines to engage two receiving notches 174 in the periphery of the pallet 30. If these notches 174 are initially slightly out of alignment with the splines 170, the chisel-shaped spline ends 172 facilitate correct alignment of the pallet on entrance to the receiving notches 174.

The workpiece W is retained within the cylindrical wall 178 of a recess in the top surface of the pallet 30. The rotative position of the workpiece W relative to the pallet is determined by a pin 179 in the pallet extending into a hole 180 in the workpiece. Orientation could, if desired, be determined by some means other than the pin and hole as thus described.

Figure 12:
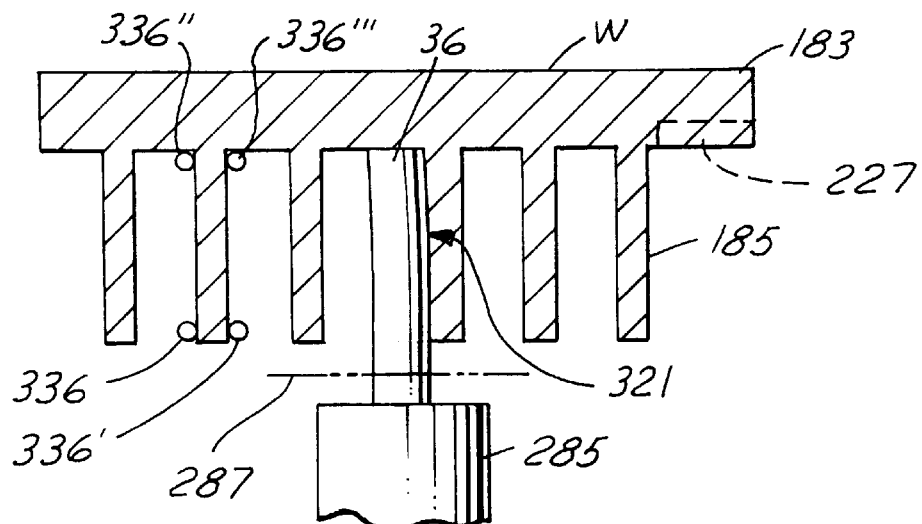
FIG. 12 is a sectional view taken along the line 12—12 in FIG. 11.
Figure 11:
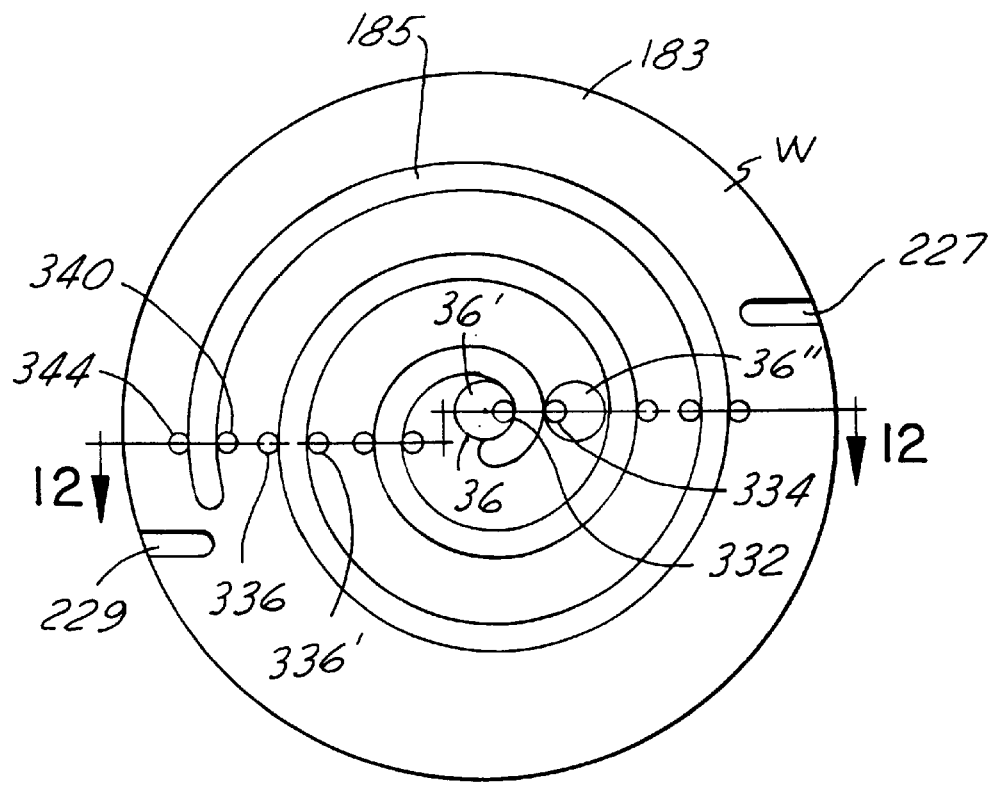
FIG. 11 is a plan view of a typical scroll workpiece after finish machining.
Figure 15:
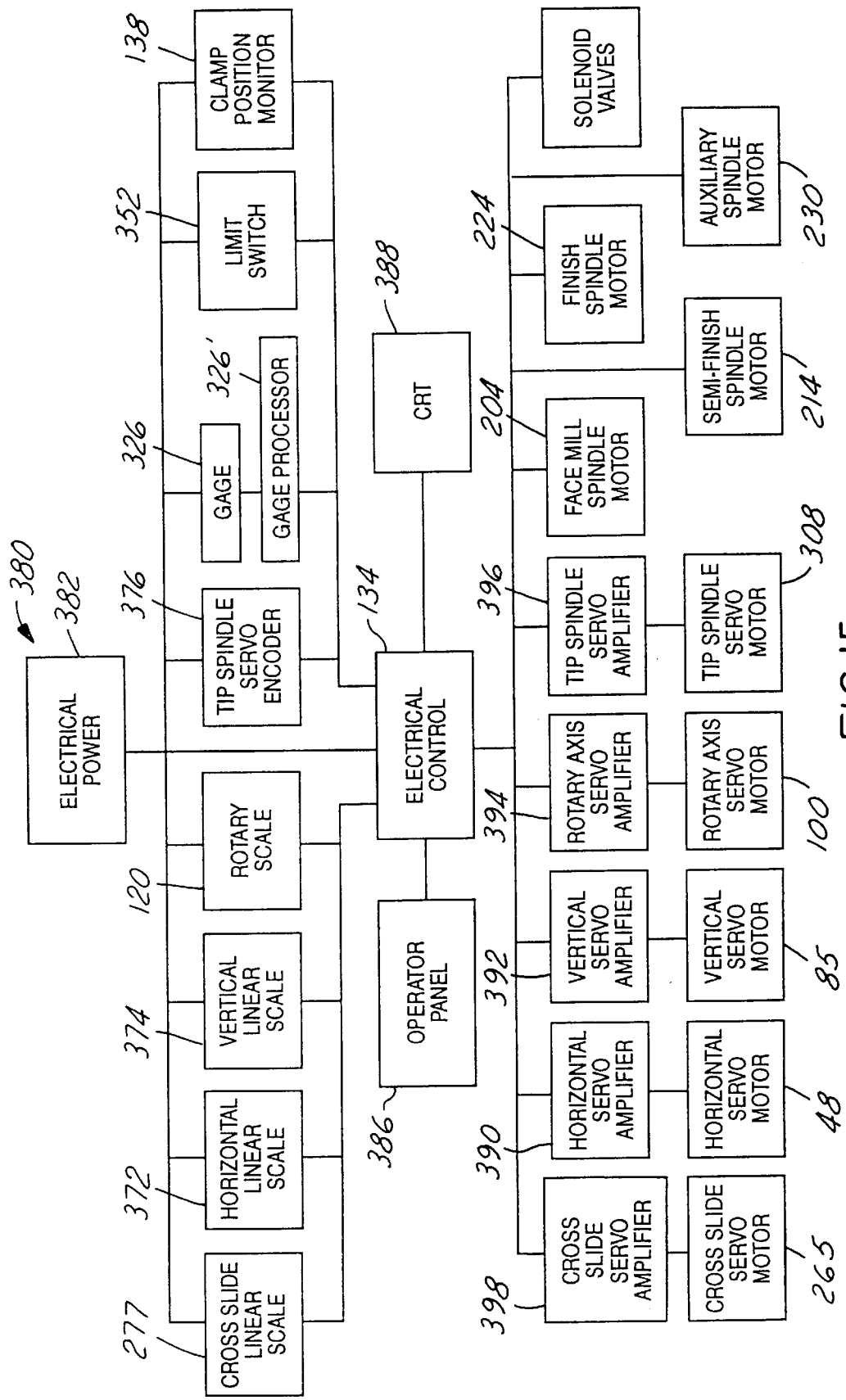
FIG. 15 is a block diagram of the electrical facilities.

The workpiece W as shown in FIGS. 11 and 12 is a cast metal scroll part of a scroll gas compressor, either the fixed scroll or the orbiting scroll. The workpiece has a flat circular base 183. An involute wall 185 projects vertically away from the surface of the base. The opposite, radially inner and outer surfaces of the wall intersect the flat surface of the base and are perpendicular thereto. When supported in a pallet 30, the base 183 is uppermost and the involute wall projects vertically downwardly. The flat base 183 also has two keyways 227 and 229 precisely positioned and offset from the centerline of the involute wall.

Figure 8:
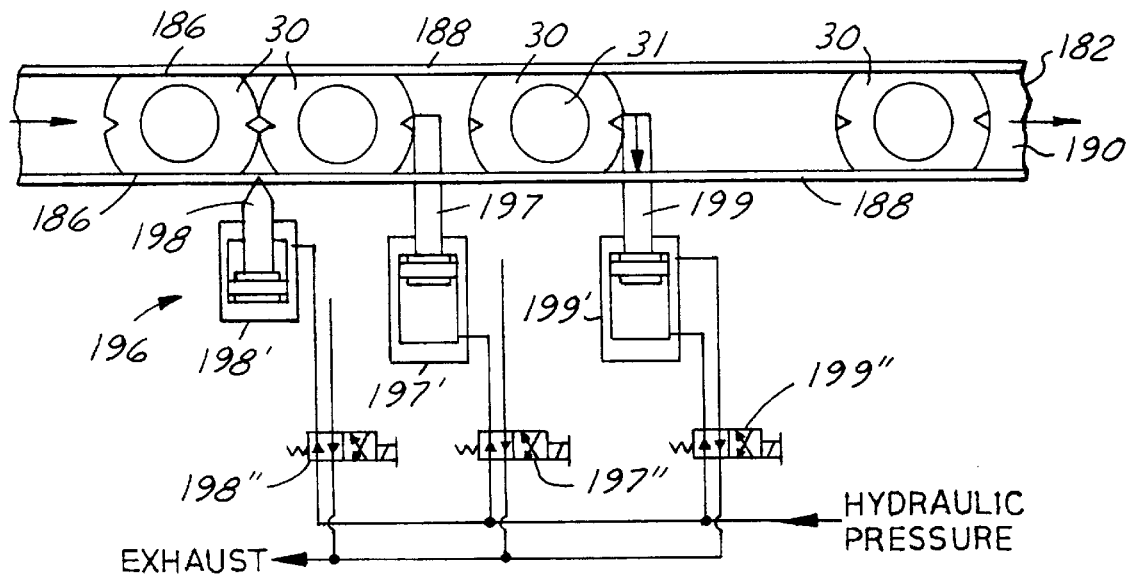
FIG. 8 is a plan view of the conveyor, taken along the line 8—8 in FIG. 2.

A series of workpiece carrying pallets 30 are carried to the loading station on a horizontal belt conveyor 182 which extends through the front of the machine and beneath the rotary shaft 94, when the shaft is above the loading station 31 (FIG. 8). The pallets have diametrically opposite parallel flat sides 186 which are engaged by parallel side guide rails 188 which extend along opposite sides of the belt conveyor so that the pallets are roughly oriented when they reach the loading station. The belt conveyor 182 comprises an endless belt 190 which passes around pulleys 192 (FIG. 2), one of which is driven by a motor (not shown). The pallets 30 are supported on the upper run of the belt. A leaf spring 194 beneath the belt has its opposite ends secured to the machine frame 20. The leaf spring 194 provides a resilient support under belt 190 for backing up a pallet as a workpiece thereon is being loaded into the chuck, forcing the workpiece into the chuck against the pin locators 164. A limit switch 194' is mounted on the conveyor frame beneath the leaf spring 194.

Auto Load Sequence

The milling machine 18 has an auto load sequence which in part consists of:

(A) A horizontal movement of slide 24 to position the rotary shaft 94 and chuck 28 over the loading station 31;

(B) A rotation of shaft 94 to orient chuck 28 so that splines 170 will enter the notches 174 in a pallet 30;

(C) A lowering of the vertical slide 26, shaft 94 and chuck 28 to envelop pallet 30 with the internal splines 170 engaging and centering notches 174 to center the pallet 30 in chuck 28;

(D) The bottom faces of workpiece locators 164 engage the top surface of workpiece W;

(E) Continued downward movement causes the locators 164 to force the workpiece W, belt 190, and center portion of leaf spring 194 into deflection, thus firmly pressing the workpiece W against the locators;

(F) Solenoid valve 132 is de-energized by electrical control 134, directing hydraulic pressure to the bottom of piston 128 causing it to move upward and through the agencies of rod 142, rod 150 and diaphragm plate 160, to cause chuck jaws 162 to clamp on workpiece W. If workpiece W is faulty in position or size, such that the chuck jaws do not close the normal amount, the clamp position monitor 138 will signal fault to the electrical control 134 and shut the machine down. If workpiece W, for some reason such as being inverted, being too thick, etc. does not allow the chuck to envelop it properly, the workpiece W, pallet 30, belt 190 and leaf spring 194 may be over-depressed, thus contacting and triggering limit switch 194' which is mounted on the conveyor frame beneath the leaf spring. Limit switch 194' signals fault to the electrical control for shut down; and (G) Clamp operation is followed by an upward move of the vertical slide 26 to extract workpiece W from pallet 30.

A workpiece escapement assembly for pallets moving on conveyor 182 is shown in FIG. 8, generally designated 196. An intermediate pallet stop blade 197 is shown extended by hydraulic cylinder 197' under control of solenoid valve 197" and stopping the advance of all incoming pallets 30. The belt 190, moving in the direction indicated, slides underneath the pallets.

Similarly, a first stop blade 198 is positioned to stop all but the lead pallet, when extended by cylinder 198' under control of valve 198".

The third stop blade 199 is positioned to stop a single pallet in the load position 31 as released by the intermediate blade 197 and is extended by cylinder 199' under control of valve 199". All valves are solenoid controlled by the electrical control 134.

Escapement Sequence

The escapement sequence control is as follows:

(A) Third stop blade 199 retracts allowing the escape of a first pallet carrying a finish machined workpiece and first stop blade 198 extends, stopping all incoming pallet advance except for the single pallet beyond blade 198 position;

(B) Third stop blade 199 again extends and second stop blade 197 retracts, allowing a single pallet to escape to the load position 31 shown and stopped by blade 199; and (C) Second stop blade 197 again extends and first stop blade 198 retracts allowing the pallets to advance until stopped by the second blade 197.

The milling tools are all supported in a spindle containment receptacle 39 (FIG. 1A). The face mill 32 is carried by a cylindrical mount spindle 204. The mount spindle 204 is fitted within a cylindrical socket 205 bored in the top face 206 of the receptacle, and has a flange 207 resting on the top face. Mill 32 is large enough in diameter to rough mill the whole face of the involute walls of a workpiece W in a single pass. The spindle 204 is driven by belt 210 and drive motor 212.

The receptacle 39 has a second cylindrical socket 213 bored into its top face to receive the cylindrical spindle 214 for the semi-finish end mill 34. The spindle 214 has a flange 215 resting on the top face 217 of the receptacle. The spindle 214 has an internal motor for driving the end mill 34 which is small enough in diameter to enter the groove between the involute walls of the workpiece W and long enough to reach the base 183 at the bottom of the groove. The end mill is capable of simultaneous end milling and side milling.

The receptacle 39 has a machined opening 220 receiving a spindle tip assembly 222 which mounts the finish cylindrical spindle 224. The spindle 224 has an internal motor and is equipped with the finish end mill 36. The finish mill 36 is small enough in diameter to enter the groove between the involute walls of the workpiece and large enough to reach the base at the bottom of the groove. The end mill 36 is capable of simultaneous end and side milling.

A bored cylindrical socket 228 in the face of the receptacle receives a cylindrical auxiliary spindle 230 which is equipped with the end mill 37 suitable for milling additional features of the workpiece W, for example, keyways 227 and 229 (FIG. 11). Spindle 230 also has an internal motor for driving the end mill.

The bored holes or sockets in the receptacle 39, and hence the spindles 204, 214, 224 and 230 mounted therein, are disposed in spaced apart relation along a straight line 236 (FIG. 3) coinciding with the path 238 (FIG. 1A) of a workpiece W held by the chuck 28 as it moves across the top of the receptacle from the loading station 31 to the milling area 38.

The receptacle 39 has vertically extending walls 240, 242, 244 and 246 which enclose the milling area 38 of the receptacle in which the milling tools are located. The upper portion of wall 240 is completed by a hinged wall section 248 pivoted at 250. This hinge wall section 248 is only a short distance below a workpiece W as it is carried by the chuck 28 from the loading station 31 to the milling area 38. However, if the workpiece should contact the hinged wall section 248 as it passes over the wall 240 due to improper loading, for example, a limit switch 252 will be engaged and a fault signal to the electrical control 134 will shut down the machine before the workpiece can enter the milling area 38 and cause damage or itself be damaged.

As seen in FIGS. 13 and 14, the receptacle 39 has a flat bottom 254 and two rearwardly extending legs 255 an 257. The receptacle is mounted on roller trucks 259, 259' and are mounted on cross ways to allow motion from front to back perpendicular to the line 236 of spindles. The cross ways in turn are supported by an inverted T-shaped appendage 261 fastened to the bottom face 268 of the support block 22. Appendage 261 is positioned between the legs 255 and 257 of the receptacle.

The support block also supports a servo drive assembly 263 for moving the cross slide. The servo drive assembly 263 comprises a servo motor 265, and drive shaft 267 connected to a cross slide ball screw 269 by a flexible coupling 271. One end of the ball screw 269 is supported by bearing block 273 to allow rotation of the ball screw but prevent axial movement. The other end of the ball screw engages a ball nut 275. Ball nut 275 is bolted to the receptacle 39. Rotation of the ball screw 269 causes translation of the receptacle front to back.

A linear scale 277 (FIG. 14) is provided to monitor the position of the receptacle in its cross slide motion. Scale 277 consists of a reader 277' attached to support block 22 and a scale 277" which is attached to and moves with the cross slide.

This provision allows the spindles to be offset from the centerline 266 of the rotary axis for ease in machining offset keyways 227, 229 and other scroll features as needed.

Figure 4:
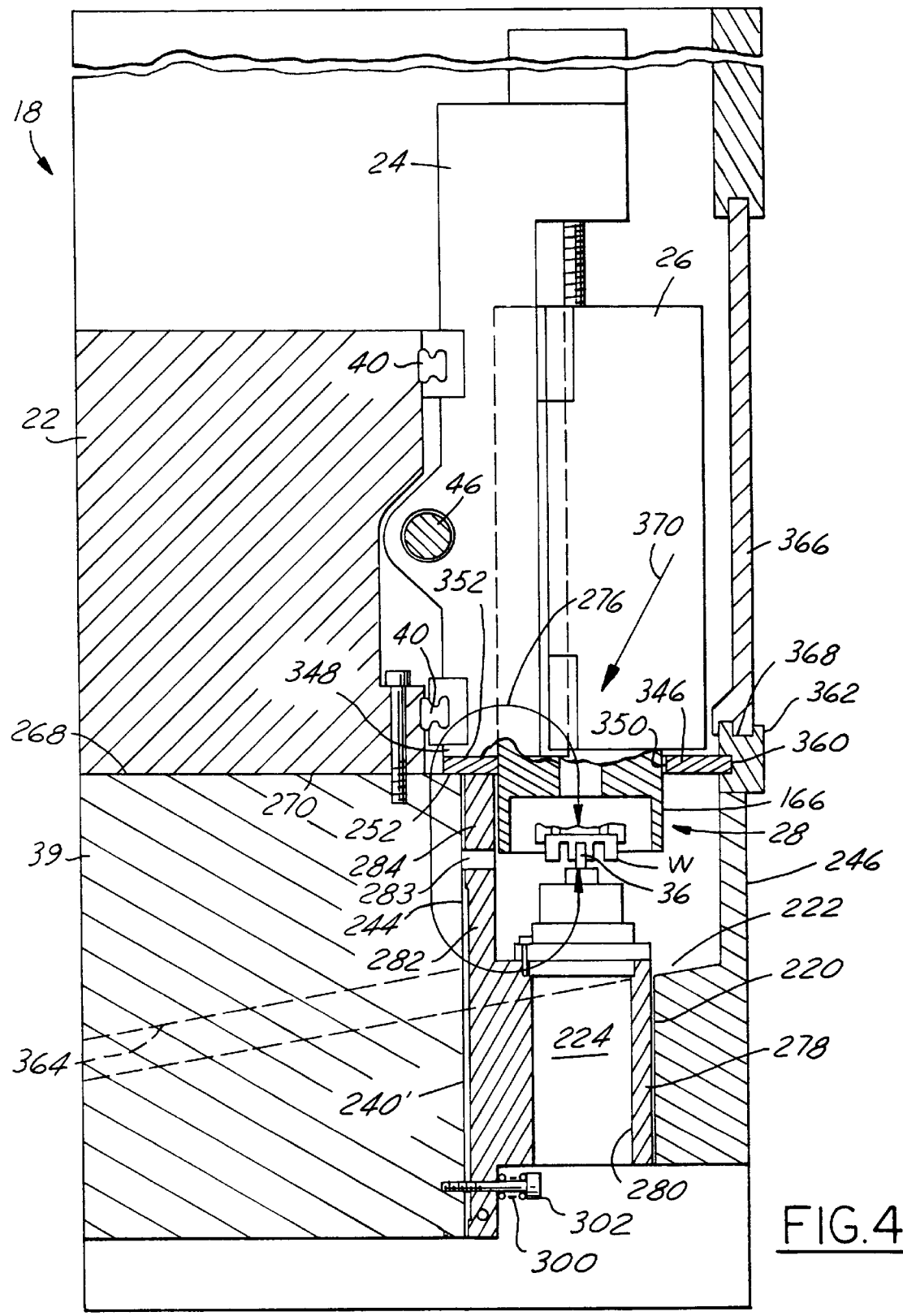
FIG. 4 is a sectional view taken on the line 4—4 in FIGS. 1A and 1B.

The elliptical path 276 in FIG. 4 shows the short route for thermal and stress distortion, minimizing machine inaccuracy due to these causes.

The spindle tip assembly 222 for the finish mill 36 is a modification of that described in the Garnett/Watson application, previously referred to. The spindle tip assembly 222, as shown in FIGS. 1A and 4, comprises a housing 278 bored to provide a hole 280 for receiving the spindle 224. Housing 278 has a vertically elongated plate-like extension 282 which near its upper end has a necked-down portion 283 which serves as a flexure member. Above the necked-down portion 283, the plate extension 282 widens to an anchor plate 284. Anchor plate 284 is bolted securely to a wall of the receptacle 39. The necked-down portion 283 is strategically positioned to allow flexure of the necked portion at 287 (FIG. 12) slightly above the shank 285 of end mill 36 which is mounted in spindle 224.

Below the necked-down portion 283, plate extension 282 again widens to wing-like projections 288 and 290, each of which carry anti-friction wear pads 292 and 294, respectively, which guide on the wall 244 of the receptacle 39 during operation. A downward projection 296 of plate extension 282 has a third wear pad 298 which also guides on wall 244 of the receptacle to complete a three-point location of the spindle tip assembly 222 against wall 244 of the receptacle. Projection 296 is urged toward wall 244 of the receptacle by a compression spring 300 (FIG. 4) under compression by bolt 302 which threadedly engages wall 244.

A tip spindle servo assembly 306 (FIG. 1A) is attached to a tapped hole 304 in the projection 296 of plate 282. Tip spindle servo assembly 306 comprises a servo motor 308, and a drive shaft 310 which has a differential screw 311. The differential screw 311 has a threaded section 312 with the same thread as the tapped hole 304 in which it engages. It also has a second threaded section 316 whose pitch is slightly greater than the pitch of threaded section 312. A guide and support block 318 is attached to wall 244 of the receptacle and is tapped to match and receive the threaded section 316. Block 318 also has a counterbore 319 receiving a compression spring 320 which bears against the bottom of the counterbore and also against the downward extension 296, urging the extension 296 to the right in FIG. 1A and preloading any thread clearance in threads 312 and 316. Differential screw 311 restrains movement to the right.

The servo motor 308, under the control of electrical control 134, operates the tip spindle assembly 306 to tip the spindle housing 278 and spindle 224 in one direction or the other in a manner analogous to that in the Garnett/Watson application previously referred to. The reason for the tip spindle assembly is that milling machines which employ end mills are subjected to side cutting loads as indicated by arrow 321 which result in cantilever or side deflection of the end mill away from the cutting surface, with the tip of the mill deflecting more than the shank. As a result, both the side milled surface and the end milled surface may not be true to the part and may deviate from the prescribed path. In critical applications, such as the milling of scroll parts for scroll gas compressors, in which the vertical walls and bottom surfaces of the scroll parts form the sealed gas pockets, any error in the machining of the parts prevents precise seal contact.

A gaging station 326 shown in FIG. 1A is mounted on the support block 22 adjacent to the loading station 31. The gaging station 326 consists of two electronic indicators 328 and 328'. These indicators consist of housings containing linear variable differential transducers, mechanical linkages and extended probes 330 and 330'. The outer end of each of the probes is equipped with a ball-like end which contacts features of the workpiece W when the workpiece is lowered over the gaging station after the workpiece has been machined. The deflection of the probe causes a variable electrical output from the transducer which is dependent upon the amount of deflection of the probe. The electrical output is then digitized to a machine recognizable code. Any deviation from the null (zero) is processed by electrical control 134 and added to or subtracted from the existing tool offset file for that particular workpiece. Referring to FIG. 12, end mill 36 shows the cantilever type deflection resulting from side pressure shown by the arrow on the end mill when side milling. This results in wall taper and the amount of taper continuously varies.

In FIG. 11, a position 36' of end mill 36 is shown milling the inner wall in which there is a large wrap-around contact with the end mill, causing large deflection of the end mill and large taper of the wall. End mill position 36" shows milling the outer wall in which there is little wrap-around and hence much less deflection. The same end mill cuts both walls.

The method of correction of wall taper is as follows:

After a workpiece has been milled, it is transported and rotated to a position over the gaging station 326 by a combination of moves by the horizontal slide 24 and vertical slide 26 under electrical control 134. Programmed moves are established to create a null (zero) output of the gage if the wall positions are correct when the workpiece is lowered into the gage probes by vertical slide 26. Gage readings are taken at the outer tip of the wall 336 and 336' (FIG. 12) The part is again lowered and gage readings are taken at the base of the wall 336" and 336'''. Multiple readings are taken at several positions around the scroll and processed, through algorithms in the electrical control 134, to correct tool offsets for subsequently machined workpieces as follows:

(A) Wall Position—Measurement 336 directly compensates for position error in the outer side of the wall. Measurement 336' directly compensates for position error in the inner side of the wall;

(B) Wall Taper—Base outer wall measurement 336" minus tip outer wall measurement 336 directly compensates for outer wall taper in the 336 area by tipping the spindle to affect the base position of the outer wall with nil effect at the tip of the wall.

Similarly, base inner wall measurement 336''' minus tip inner wall measurement 336' directly compensates for inner wall taper in the 336' area. Multiple areas along the scroll wall are similarly measured and compensated.

(C) Wall Thinning—As the end mill mills along the scroll from center to outer end, milling deflections can also cause a gradual deviation from a true involute. Inner wall measurement 340 at the outer end of the scroll, minus measurement 332 at the inner end of the scroll, is entered in the tool offset file of the electrical control to compensate for plus or minus variation from the true involute of the inner wall from center to outer end of the scroll.

Similarly, outer wall measurement 344 at the outer end of the scroll minus measurement 334 at the inner end of the scroll is entered to compensate for plus or minus variation from the true involute of the outer wall from center to outer end of the scroll.

Gage measurements are to be taken only occasionally for instance:

(A) At the start of the work day;

(B) After a new end mill has been installed; or (C) On a programmed basis.

A sliding cover 346 (FIGS. 1A and 4) is attached to the lower portion 348 of horizontal slide 24 and moves with the slide 24 in its horizontal travel. Cover 346 has an opening 350 to allow vertical passage of the tubular projection 166 of chuck 28. The back edge 352 of cover 346 rides on the top surface 252 of the receptacle 39. The front edge of the cover 346 rides in a groove 360 in an elongated bar 362 which is mounted on the front wall 246 of the receptacle 39. Cover 346 also rides on the wall 242 of the receptacle and on the hinge wall section 248 to complete the enclosure of the milling area in the receptacle.

During operation of the machine, the vertical slide 26 is elevated sufficiently to raise the tubular projection 166 surrounding chuck 28 and the workpiece W slightly above the bottom of cover 346 to allow passage over the wall section 248 of the receptacle.

Since the machining area, enclosed by the receptacle 39 and cover 346, are closed in normal operation including workpiece loading and unloading, coolant mist created by the machining operation is confirmed and allowed to coalesce to a liquid before draining from the machine cavity, thus preventing the mist from contaminating the environment.

The receptacle 39 has a narrow inclined passage 364 (FIGS. 3 and 4) which allows for the escape of cutting fluid and chips associated with the machining operation.

Cover 346 is made in two sections 364' and 364" (FIG. 1A). Section 364" is manually detachable from section 364' to allow section 364" to be slid aside to provide access to the spindles 204, 214, 224 and 230 for servicing the mill cutters. A front door 366 (FIG. 4) may be slid aside in a groove 368. Arrow 370 shows the direct line of sight and easy access that this arrangement provides for tool exchange.

A linear scale 372 (FIG. 2) is provided to monitor the position of the horizontal slide 24. This scale 372 consists of a reader 372' which is attached to and moves with the slide 24, and a scale 372" which is mounted on and held stationary by the support block 22.

A linear scale 374 (FIG. 3) is also provided to monitor the position of vertical slide 26. Scale 374 consists of a reader 374' attached to horizontal slide 24, and a scale 374" which is attached to and moves with the vertical slide.

A rotary encoder 376 (FIG. 1A) is contained within servo motor 308 to monitor the rotary position of this motor. Encoder 376 consists of a reader 376' attached to the motor housing and a scale 376" which is attached to and rotates with the shaft 310 of the motor.

The spindles 204, 214, 224 and 230 (FIGS. 1A and 3) are each of a cylindrical cartridge type and are fully accessible from above for extraction from the receptacle 39 by an overhead crane or other device, for servicing or replacement. The fitted bore and face of the receptacle provide precise positioning without tedious alignment procedures.

An electrical enclosure 378 (FIGS. 2 and 3) contains an electrical control facility 380 which comprises all of the electrical controls required for operation of the machine (FIG. 13). As there shown, an electrical power source 382 delivers power to an electrical control 134 and to position feedback devices, horizontal linear scale 372, vertical linear scale 374, rotary scale 120, tip spindle servo encoder 376, clamp position monitor 138, and to gage 326 and then to gage processor 326'. All feedback devices have feedback to the electrical controls 134. Limit switch 252 also input signal to control 134.

An operator panel 386 (FIG. 3) controls the electrical control 134. A cathode ray tube 388 is mounted within operator panel 386 for the operator's reference. The electrical control 134 governs the operation of the motors for spindles 204, 214, 224 and 230, all servo amplifiers 390, 392, 394, 396, 398 and therefore all servo motors 48, 85, 100, 308, 265, and the various solenoid valves.

Operation of machine 18 is as follows:

The workpiece loading sequence has previously been described. Starting with the workpiece in position shown in FIG. 1A in which it has been raised so its lower face is slightly above the lower face of sliding cover 346, the workpiece is traversed left as shown by arrow 400, passing over hinged wall section 248. The workpiece is then lowered (arrow 402) to a level to make a semi-finish mill cut across its face by mill cutter 32. The workpiece W when clamped by the chuck jaws at the loading station 31 is oriented with its base 183 horizontal and its scroll wall 185 extending vertically downwardly. The workpiece is retained in this same orientation throughout it subsequent movement to the milling area where it is milled by the milling tools, and back to the loading station where it unloaded and/or gaged. Any mist or chips produced by milling easily drops away at the bottom of the workpiece.

The workpiece then moves left across (arrow 404) the face mill cutter 32, thus semi-finish milling the entire face in a single pass. The workpiece continues left (arrow 406) over the top of semi-finish end mill 34. The workpiece is then lowered by vertical slide, over end mill 34 to a depth equivalent to the semi-finish depth of the scroll (arrow 407). The cover 346 moves with the horizontal slide 24 so that the chuck 28 can move up and down through the hole 350 in the cover. The spiral wall and bottom of the scroll are then machined by a combination of moves by the rotary shaft 94 and horizontal slide 24. The workpiece is then raised to a level above the finish end mill 36 (arrow 408), then traversed left (arrow 410) and then lowered (arrow 412) over the end mill 36. The walls and bottom of the scroll are then finish milled by the finish end mill 36 by a combination of moves by the rotary shaft 94 and horizontal slide. The workpiece is then raised (arrow 414) and the tips of the scroll wall are finish milled.

The workpiece is further traversed left (arrow 416) over the auxiliary end mill 37. Through a combination of rotary, horizontal, vertical and cross slide movements (arrow 418 and 420), auxiliary milling is done on the workpiece, which may include key slots or holes that are precisely located in respect to the scroll profile. The workpiece is again raised (arrow 422) within cover 346 for transport (arrow 424) return to the loading station 31.

The loading station now becomes the unload station. The finish milled workpiece is now lowered into the same pallet 30 from which it was earlier extracted. Part chuck 28 unclamps the workpiece and the vertical slide 26 retracts the empty chuck upward to clear the part. The escapement sequence previously described allows the pallet with the finish machined workpiece to escape and advances a pallet, with an unfinished workpiece, into the load station 31.

To check machining accuracy at the beginning of the day, when there is an exchange of tools, and on a programmed basis, a workpiece temporarily by-passes the unload station and is transported directly to the gage station 326.

The finish milled workpiece is lowered over the gage to measure its accuracy. Any deviations thus found are processed by the gage processor 326' and corrections fed to the electrical control 134 to improve accuracy in subsequently machined workpieces.

The workpiece is then transported to the unload station for a typical unload operation.

What is claimed is:

1. A milling machine comprising
   a machine frame,
   a first slide,
   means mounting said first slide on said frame for horizontal movement along a path between a loading station and a milling area,
   a second slide,
   means mounting said second slide on said first slide for vertical sliding movement,
   a chuck mounted on said vertical slide and having means to grip a workpiece at the loading station,
   means for vertically moving said second slide while said first slide is at the loading station to lower the chuck to a workpiece gripping position and to raise the chuck and the workpiece gripped thereby,
   means for moving said first slide together with the second slide mounted thereon and the chuck and the workpiece gripped by the chuck, to the milling area,
   means in said milling area for milling a workpiece held by the chuck when the first slide is moved to the milling area,
   said milling means comprising a plurality of milling tools arranged in spaced apart relation in a straight line parallel to said path,
   all of said milling tools being mounted in a common receptacle, and
   positioning means for adjustably positioning said receptacle with respect to the machine frame, said receptacle being mounted on cross way means perpendicular to said straight line and being movable along said cross way means to an adjusted position by said positioning means.

2. A milling machine comprising
   a machine frame,
   a first slide,
   means mounting said first slide on said frame for horizontal movement between a loading station and a milling area,
   a second slide,
   means mounting said second slide on said first slide for vertical sliding movement,
   a chuck mounted on said vertical slide and having means to grip a workpiece at the loading station,
   means for vertically moving said second slide while said first slide is at the loading station to lower the chuck to a workpiece gripping position and to raise the chuck and the workpiece gripped thereby,
   means for moving said first slide together with the second slide mounted thereon and the chuck and the workpiece gripped by the chuck, to the milling area,
   means in said milling area for milling a workpiece held by the chuck when the first slide is moved to the milling area,
   said milling means comprising a finish end mill,
   the means for moving said first slide comprising a ball screw drive,
   said ball screw drive including, a screw, a nut, and balls circulating in tracks in the nut and in a thread in the screw,
   the screw in a first portion of its length having a relatively shallow thread depth to bind the balls tightly between the screw thread and the ball track of the nut and thereby accurately position the first slide, in another portion of its length said screw having a relatively deep thread to more loosely confine the balls between the screw thread and the ball track, said first portion of the length of the screw corresponding to a position of the first slide in which the workpiece is milled by the finish end mill.

3. A milling machine comprising a machine frame, a first slide, means mounting said first slide on said frame for horizontal movement between a loading station and a milling area, a second slide, means mounting said second slide on said first slide for vertical sliding movement, a chuck mounted on said vertical slide and having means to grip a workpiece at the loading station, means for vertically moving said second slide while said first slide is at the loading station to lower the chuck to a workpiece gripping position and to raise the chuck and the workpiece gripped thereby, means for moving said first slide together with the second slide mounted thereon and the chuck and the workpiece gripped by the chuck, to the milling area, and means in said milling area for milling a workpiece held by the chuck when the first slide is moved to the milling area, wherein said milling means comprises a plurality of milling tools, all of said milling tools are mounted in a common receptacle, said receptacle is movably mounted on the machine frame, said milling area is enclosed by means including a cover, and said cover is secured to and movable with said first slide.

4. A milling machine as defined in claim 3, wherein at least a portion of said cover is removable to permit access to the milling area.

5. A milling machine comprising a machine frame, a first slide, means mounting said first slide on said frame for horizontal movement between a loading station and a milling area, a second slide, means mounting said second slide on said first slide for vertical sliding movement, a chuck mounted on said vertical slide and having means to grip a workpiece at the loading station, means for vertically moving said second slide while said first slide is at the loading station to lower the chuck to a workpiece gripping position and to raise the chuck and the workpiece gripped thereby, means for moving said first slide together with the second slide mounted thereon and the chuck and the workpiece gripped by the chuck, to the milling area, means in said milling area for milling a workpiece held by the chuck when the first slide is moved to the milling area, means for delivering a workpiece to the loading station comprising a conveyor, said chuck having jaws extending downwardly from said chuck to grip a workpiece at the loading station, said conveyor being downwardly yieldable to facilitate a full insertion of the workpiece between said jaws, and resilient means resisting such downward yielding of the conveyor.

6. A milling machine as defined in claim 5, wherein said resilient means comprises a leaf spring.

7. A milling machine comprising a machine frame, a first slide, means mounting said first slide on said frame for horizontal movement between a loading station and a milling area, a second slide, means mounting said second slide on said first slide for vertical sliding movement, a chuck mounted on said vertical slide and having means to grip a workpiece at the loading station, means for vertically moving said second slide while said first slide is at the loading station to lower the chuck to a workpiece gripping position and to raise the chuck and the workpiece gripped thereby, means for moving said first slide together with the second slide mounted thereon and the chuck and the workpiece gripped by the chuck, to the milling area, means in said milling area for milling a workpiece held by the chuck when the first slide is moved to the milling area, and means for detecting an improperly gripped workpiece as the first slide is moved from the loading station to the milling area.

8. A milling machine as defined in claim 7, wherein said detecting means comprises a movable member positioned to be contacted by an imperfectly clamped workpiece, and a limit switch associated with said movable member.

9. A milling machine comprising a machine frame, a first slide, means mounting said first slide on said frame for horizontal movement between a loading station and a milling area, a second slide, means mounting said second slide on said first slide for vertical sliding movement, a chuck mounted on said vertical slide and having means to grip a workpiece at the loading station, means for vertically moving said second slide while said first slide is at the loading station to lower the chuck to a workpiece gripping position and to raise the chuck and the workpiece gripped thereby, means for moving said first slide together with the second slide mounted thereon and the chuck and the workpiece gripped by the chuck, to the milling area, and means in said milling area for milling a workpiece held by the chuck when the first slide is moved to the milling area, wherein said milling means comprises a plurality of milling tools, all of said milling tools are mounted in a common receptacle, said receptacle is movably mounted on the machine frame, said milling area is enclosed by means including a cover, said chuck has a tubular enclosure surrounding the chuck jaws, and said cover has an opening of a size sufficient to receive said chuck including said tubular enclosure.

10. A milling machine comprising a machine frame, a first slide, means mounting said first slide on said frame for horizontal movement between a loading station and a milling area, a second slide, means mounting said second slide on said first slide for vertical sliding movement, a chuck mounted on said vertical slide and having means to grip a workpiece at the loading station, means for vertically moving said second slide while said first slide is at the loading station to lower the chuck to a workpiece gripping position and to raise the chuck and the workpiece gripped thereby, means for moving said first slide together with the second slide mounted thereon and the chuck and the workpiece gripped by the chuck, to the milling area, and means in said milling area for milling a workpiece held by the chuck when the first slide is moved to the milling area, said milling means comprising a plurality of milling tools, said chuck being adapted to grip a workpiece in the form of a scroll having a base and a scroll wall projecting downwardly from said base, said milling means comprising a face mill adapted to mill the face of the scroll wall and a finish end mill adapted to mill the base and the sides of the scroll wall, and means for tipping the finish end mill to correct for scroll wall taper.

11. A milling machine as defined in claim 10, wherein the means for tipping the end mill comprises a servo motor and a differential screw.

12. A milling machine as defined in claim 11, wherein wear pads are provided to guide the tipping of the finish end mill.

13. A milling machine as defined in claim 11, in which means including a spring is provided to remove end play in the differential screw.

* * * * *